United States Patent
He et al.

(10) Patent No.: US 8,547,941 B2
(45) Date of Patent: Oct. 1, 2013

(54) APPARATUS AND METHOD FOR IMPROVING WLAN SPECTRUM EFFICIENCY AND REDUCING INTERFERENCE BY FLOW CONTROL

(75) Inventors: Jianqiang He, San Diego, CA (US); Fernando Igartua, San Diego, CA (US); Gaurav Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1093 days.

(21) Appl. No.: 12/535,531

(22) Filed: Aug. 4, 2009

(65) Prior Publication Data

US 2010/0265861 A1    Oct. 21, 2010

Related U.S. Application Data

(60) Provisional application No. 61/170,058, filed on Apr. 16, 2009.

(51) Int. Cl.
| | |
|---|---|
| *H04W 52/02* | (2009.01) |
| *H04W 84/12* | (2009.01) |
| *H04W 80/04* | (2009.01) |
| *H04W 84/18* | (2009.01) |
| *H04W 88/06* | (2009.01) |
| *H04W 74/08* | (2009.01) |
| *H04B 1/16* | (2006.01) |

(52) U.S. Cl.
USPC .................. 370/338; 370/311; 455/343.1

(58) Field of Classification Search
USPC ........................................ 370/338
See application file for complete search history.

(56) References Cited

U.S. PATENT DOCUMENTS

| 6,167,029 A | 12/2000 | Ramakrishnan |
| 6,731,613 B1* | 5/2004 | Provance ........................ 370/311 |
| 7,065,036 B1* | 6/2006 | Ryan .............................. 370/338 |

(Continued)

FOREIGN PATENT DOCUMENTS

| EP | 0917316 A2 | 5/1999 |
| WO | WO2010010028 | 1/2010 |

OTHER PUBLICATIONS

AD Kamerman et al: "WaveLAN-II: A High-Performance Wireless LAN for the Unlicensed Band" Bell Labs Technical Journal, Wiley, CA, US LNKD-D01:10.1002/BLTJ.2069, [Online] vol. 2, Jan. 1, 1997, pp. 118-133, XP002549449 ISSN: 1089-7089, p. 125, left-hand column, line 30—p. 129, right-hand column, line 6.

(Continued)

*Primary Examiner* — Ian N Moore
*Assistant Examiner* — Jenee Alexander
(74) *Attorney, Agent, or Firm* — Darren M. Simon

(57) ABSTRACT

An apparatus and method for improving WLAN spectrum efficiency and reducing interference by flow control comprising determining if at least one data packet is entering a receive buffer; determining if the utilization of the receive buffer is greater than an overflow threshold; determining if a wireless device is in power save mode, wherein the wireless device comprises the receive buffer, a WLAN transceiver and a send buffer for storing packets from an interface module to the WLAN transceiver; determining if the send buffer is empty; setting a power management bit to "1" in either a top-most packet in the send buffer or a NULL packet; and using the WLAN transceiver for transmitting either the top-most packet or the NULL packet to an access point.

19 Claims, 9 Drawing Sheets

(56) References Cited

U.S. PATENT DOCUMENTS

| | | |
|---|---|---|
| 7,433,670 B2 * 10/2008 | Benveniste | 455/343.2 |
| 7,633,891 B2 * 12/2009 | Ginzburg | 370/278 |
| 7,664,017 B2 * 2/2010 | Sagfors | 370/230 |
| 2002/0191627 A1 * 12/2002 | Subbiah et al. | 370/331 |
| 2003/0067872 A1 * 4/2003 | Harrell et al. | 370/229 |
| 2003/0099195 A1 * 5/2003 | Lee | 370/229 |
| 2003/0152056 A1 * 8/2003 | Lee et al. | 370/338 |
| 2003/0219033 A1 * 11/2003 | Silvester | 370/338 |
| 2004/0037223 A1 * 2/2004 | Harrison et al. | 370/235 |
| 2004/0071104 A1 * 4/2004 | Boesel et al. | 370/320 |
| 2004/0165530 A1 * 8/2004 | Bedekar et al. | 370/235 |
| 2004/0165548 A1 * 8/2004 | Backes | 370/328 |
| 2004/0174852 A1 * 9/2004 | Backes et al. | 370/338 |
| 2004/0179476 A1 * 9/2004 | Kim et al. | 370/230 |
| 2004/0202130 A1 * 10/2004 | Backes et al. | 370/331 |
| 2004/0213191 A1 * 10/2004 | Lee | 370/338 |
| 2004/0257995 A1 * 12/2004 | Sandy et al. | 370/235 |
| 2004/0257996 A1 * 12/2004 | Choi et al. | 370/235 |
| 2004/0264396 A1 * 12/2004 | Ginzburg et al. | 370/311 |
| 2004/0264488 A1 * 12/2004 | Yoon et al. | 370/412 |
| 2005/0036459 A1 * 2/2005 | Kezys et al. | 370/328 |
| 2005/0047375 A1 * 3/2005 | Kwon et al. | 370/335 |
| 2005/0058151 A1 * 3/2005 | Yeh | 370/445 |
| 2005/0105553 A1 * 5/2005 | Zhang et al. | 370/335 |
| 2005/0135295 A1 * 6/2005 | Walton et al. | 370/328 |
| 2005/0135318 A1 * 6/2005 | Walton et al. | 370/338 |
| 2005/0136833 A1 * 6/2005 | Emeott et al. | 455/11.1 |
| 2005/0172028 A1 * 8/2005 | Nilsson et al. | 709/231 |
| 2005/0237984 A1 * 10/2005 | Benveniste | 370/338 |
| 2005/0249227 A1 * 11/2005 | Wang et al. | 370/412 |
| 2005/0265279 A1 * 12/2005 | Markovic et al. | 370/328 |
| 2006/0114823 A1 * 6/2006 | Flemming et al. | 370/229 |
| 2006/0146875 A1 * 7/2006 | Yang | 370/468 |
| 2007/0004374 A1 * 1/2007 | Kneckt | 455/343.1 |
| 2007/0014259 A1 * 1/2007 | Fajardo et al. | 370/331 |
| 2007/0014268 A1 * 1/2007 | Kim et al. | 370/338 |
| 2007/0153695 A1 * 7/2007 | Gholmieh et al. | 370/235 |
| 2007/0153802 A1 * 7/2007 | Anke et al. | 370/395.42 |
| 2007/0183377 A1 * 8/2007 | Hoole et al. | 370/338 |
| 2007/0230493 A1 * 10/2007 | Dravida et al. | 370/412 |
| 2007/0248049 A1 * 10/2007 | Fajardo et al. | 370/331 |
| 2008/0126562 A1 * 5/2008 | Ludwig et al. | 709/235 |
| 2008/0240008 A1 * 10/2008 | Backes et al. | 370/311 |
| 2008/0270630 A1 * 10/2008 | Ruan et al. | 709/250 |
| 2008/0279163 A1 * 11/2008 | Desai | 370/338 |

OTHER PUBLICATIONS

Chandra R et al: "MultiNet: connecting to multiple IEEE 802.11 networks using a single wireless card" INF0C0M 2004. Twenty-Third Annualj0int Conference of the IEEE Computer and Communications Societies, IEEE, Piscataway, NJ, USA, vol. 2, Mar. 7, 2004, pp. 882-893, XP010740835, p. 885, left-hand column, line 35—right-hand column, line 6.

International Search Report and Written Opinion—PCT/US2010/031466, International Search Authority—European Patent Office Jul. 16, 2010.

Lee,SuKyoung, et al.; "Power-Efficient Interface Selection Scheme Using Paging o WWAN for WLAN in Heterogeneous Wireless Networks"; Yonsei University; Soul, Korea: IEEE ICC 2006.

* cited by examiner

APPARATUS AND METHOD FOR IMPROVING WLAN SPECTRUM EFFICIENCY AND REDUCING INTERFERENCE BY FLOW CONTROL

CLAIM OF PRIORITY UNDER 35 U.S.C. §119

The present Application for Patent claims priority to Provisional Application No. 61/170,058 entitled "Flow Control Method for Improving WLAN Spectrum Efficiency and Reducing Interference in a Cellular Phone" filed Apr. 16, 2009, and assigned to the assignee hereof and hereby expressly incorporated by reference herein.

FIELD

This disclosure relates generally to apparatus and methods for communication using a wireless local area network (WLAN). More particularly, the disclosure relates to improving WLAN spectrum efficiency and reducing interference by flow control.

BACKGROUND

In business, government, academic and home applications, the widespread need for interconnectivity among a diverse variety of user devices such as mobile phones, personal computers, personal digital assistants (PDA), etc. to communications infrastructure has driven the widespread usage of wireless communication networks. Wireless networks offer the distinct advantages of rapid deployment, tetherless access, ad-hoc topology, and user mobility. On the other hand, wireless networks are often restricted in user data rate and coverage area by co-channel interference. Wireless communication systems also must carefully manage their spectral utilization since the radio spectrum is a scarce resource in most geographical areas.

One form of wireless communication networks is known as a wireless local area network (WLAN). WLANs provide network connectivity without wired connection over a local area such as an office floor, factory, school, airport, coffee shop, outdoor plaza, etc. The coverage radius of a WLAN access point is usually less than 300 m. One commonly used wireless network standard is based on the IEEE 802.11 protocol, also known as WiFi. The 802.11 protocol consists of a family of wireless protocols with different modulation techniques and data rates all operating within the 2.4 GHz or 5 GHz bands or any other bands allowed by the IEEE 802.11 specification.

SUMMARY

Disclosed is an apparatus and method for improving WLAN spectrum efficiency and reducing interference by flow control. According to one aspect, a method for improving WLAN spectrum efficiency and reducing interference by flow control comprising determining if at least one data packet is entering a receive buffer; determining if the utilization of the receive buffer is greater than an overflow threshold; determining if a wireless device is in power save mode, wherein the wireless device comprises the receive buffer, a WLAN transceiver and a send buffer for storing packets from an interface module to the WLAN transceiver; determining if the send buffer is empty; setting a power management bit to "1" in either a top-most packet in the send buffer or a NULL packet; and using the WLAN transceiver for transmitting either the top-most packet or the NULL packet to an access point.

According to another aspect, a method for improving WLAN spectrum efficiency and reducing interference by flow control comprising using a processor in a wireless device for determining if at least one data packet is entering a receive buffer; determining if the utilization of the receive buffer is greater than an overflow threshold and determining if the utilization of the receive buffer is greater than an underflow threshold; determining that the wireless device is in power save mode, wherein the wireless device comprises the receive buffer, a WLAN transceiver and a send buffer for storing packets from an interface module to the WLAN transceiver; determining if the send buffer is empty; and determining if a top-most packet in the send buffer is a PS_POLL packet or a trigger packet, which is a QoS (quality of service) packet or QoS Null packet associated with an AC (access catergory) if the wireless device has been configured to be trigger-enabled.

According to another aspect, a method for improving WLAN spectrum efficiency and reducing interference by flow control comprising using a processor in a wireless device for determining if at least one data packet is entering a receive buffer; determining if the utilization of the receive buffer is greater than an overflow threshold and determining if the utilization of the receive buffer is greater than an underflow threshold; determining that the wireless device is in power save mode, wherein the wireless device comprises the receive buffer, a WLAN transceiver and a send buffer for storing packets from an interface module to the WLAN transceiver; pushing a PS_POLL packet or a trigger packet (if the wireless device has been configured to be trigger-enabled) with power management bit set to "1" into the send buffer; and setting the power management bit to "1" in a top-most packet in the send buffer and using the WLAN transceiver to transmit the top-most packet to an access point.

According to another aspect, a wireless device for improving WLAN spectrum efficiency and reducing interference by flow control comprising a WLAN transceiver for receiving at least one data packet; a receive buffer for storing the at least one data packet: a host system with an interface module coupled to the receive buffer wherein the host system processes the at least one data packet; a send buffer coupled to the interface module for storing packets from the host system to the WLAN transceiver; and a processor configured to perform the following steps: a) determine if the at least one data packet is entering the receive buffer; b) determine if the utilization of the receive buffer is greater than an overflow threshold; c) determine if the wireless device is in power save mode; d) determine if the send buffer is empty; e) set a power management bit to "1" in either a top-most packet in the send buffer or a NULL packet; and f) command the WLAN transceiver to transmit either the top-most packet or the NULL packet to an access point.

According to another aspect, a wireless device for improving WLAN spectrum efficiency and reducing interference by flow control comprising a WLAN transceiver for receiving at least one data packet; a receive buffer for storing the at least one data packet; a host system with an interface module coupled to the receive buffer wherein the host system processes the at least one data packet; a send buffer coupled to the interface module for storing packets from the host system to the WLAN transceiver; and a processor configured to perform the following steps: a) determine if the at least one data packet is entering the receive buffer; b) determine if the utilization of the receive buffer is greater than an overflow threshold and determine if the utilization of the receive buffer is greater than an underflow threshold; c) determine that the wireless device is in power save mode; d) determine if the send buffer is empty; and e) determine if a top-most packet in the send buffer is a PS_POLL packet or a trigger packet (if the wireless device has been configured to be trigger-enabled).

According to another aspect, a wireless device for improving WLAN spectrum efficiency and reducing interference by flow control comprising a WLAN transceiver for receiving at least one data packet; a receive buffer for storing the at least one data packet; a host system with an interface module coupled to the receive buffer wherein the host system processes the at least one data packet; a send buffer coupled to the interface module for storing packets from the host system to the WLAN transceiver; and a processor configured to perform the following steps: a) determine if the at least one data packet is entering the receive buffer; b) determine if the utilization of the receive buffer is greater than an overflow threshold and determine if the utilization of the receive buffer is greater than an underflow threshold; c) determine that the wireless device is in power save mode; d) push a PS_POLL packet or a trigger packet (if the wireless device has been configured to be trigger-enabled) with power management bit set to "1" into the send buffer; and e) set the power management bit to "1" in a top-most packet in the send buffer; and wherein the WLAN transceiver transmits the top-most packet to an access point.

According to another aspect, a computer-readable medium having a computer program comprising instructions, which when executed by at least one processor, operates to improve WLAN spectrum efficiency and reduce interference by flow control, the computer program comprising instructions for determining if at least one data packet is entering a receive buffer; instructions for determining if the utilization of the receive buffer is greater than an overflow threshold; instructions for determining if a wireless device is in power save mode, wherein the wireless device comprises the receive buffer, a WLAN transceiver and a send buffer for storing packets from an interface module to the WLAN transceiver; instructions for determining if the send buffer is empty; instructions for setting a power management bit to "1" in either a top-most packet in the send buffer or a NULL packet; and instructions for using the WLAN transceiver for transmitting either the top-most packet or the NULL packet to an access point.

According to another aspect, a computer-readable medium having a computer program comprising instructions, which when executed by at least one processor, operates to improve WLAN spectrum efficiency and reduce interference by flow control, the computer program comprising instructions for determining if at least one data packet is entering a receive buffer; instructions for determining if the utilization of the receive buffer is greater than an overflow threshold and determining if the utilization of the receive buffer is greater than an underflow threshold; instructions for determining that a wireless device is in power save mode, wherein the wireless device comprises the receive buffer, a WLAN transceiver and a send buffer for storing packets from an interface module to the WLAN transceiver; instructions for determining if the send buffer is empty; and instructions for determining if a top-most packet in the send buffer is a PS_POLL packet or a trigger packet (if the wireless device has been configured to be trigger-enabled).

According to another aspect, a computer-readable medium having a computer program comprising instructions, which when executed by at least one processor, operates to improve WLAN spectrum efficiency and reduce interference by flow control, the computer program comprising instructions for determining if at least one data packet is entering a receive buffer; instructions for determining if the utilization of the receive buffer is greater than an overflow threshold and determining if the utilization of the receive buffer is greater than an underflow threshold; instructions for determining that a wireless device is in power save mode, wherein the wireless device comprises the receive buffer, a WLAN transceiver and a send buffer for storing packets from an interface module to the WLAN transceiver; instructions for pushing a PS_POLL packet or a trigger packet (if the wireless device has been configured to be trigger-enabled) with power management bit set to "1" into the send buffer; instructions for setting the power management bit to "1" in a top-most packet in the send buffer; and instructions for using the WLAN transceiver to transmit the top-most packet to an access point.

Advantages of the present disclosure include using the WLAN power save mechanism to adjust the speed of incoming data flow to avoid unnecessary retransmissions, decrease packet dropping, improve WLAN spectrum efficiency and reduce interference.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
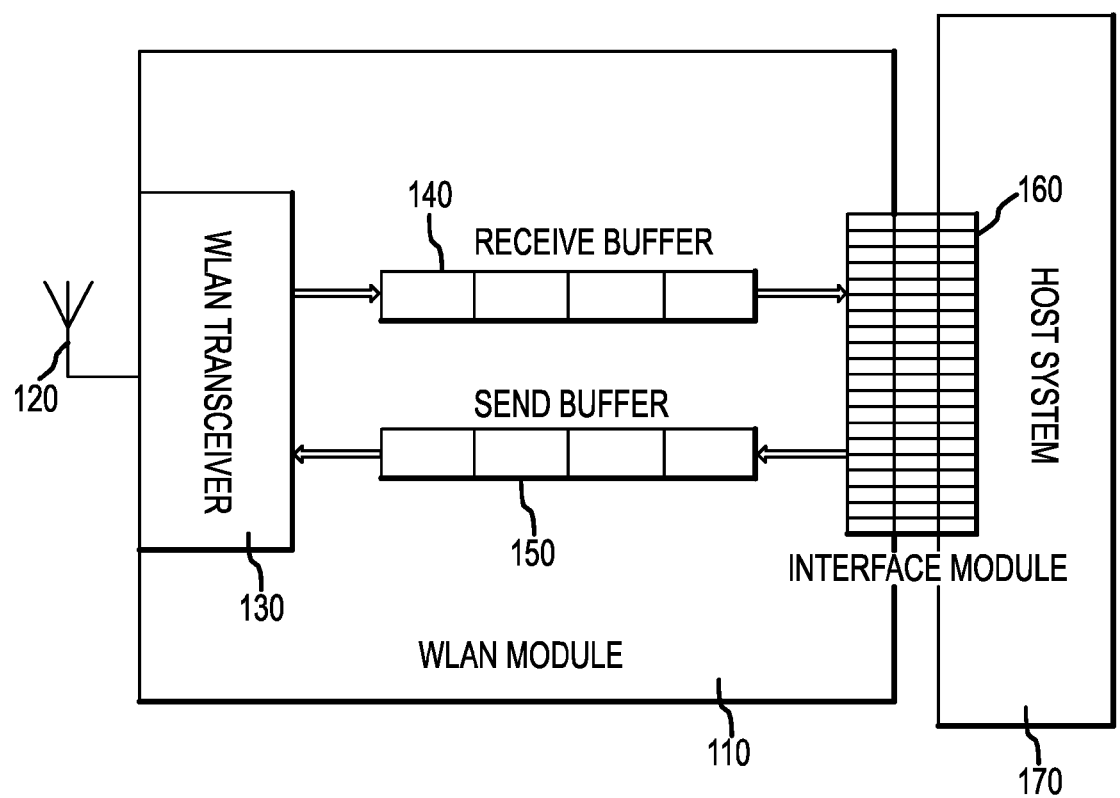
FIG. 1 illustrates an example block diagram of a wireless device comprising a WLAN module, a host system and an interface module.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Network architectures are often described by a network protocol layering model. In this model, the lowest layer, the physical layer (PHY), captures the physical means of transporting bits across nodes within the network. For example, the physical layer defines the modulation and channel coding parameters of the wireless link. The Medium Access Control (MAC) layer resides above the physical layer and provides the addressing protocols to enable access to the physical layer by one or several link users. Other protocol layers, such as the network layer, transport layer, and others are considered higher up in the protocol layer hierarchy.

In general, the 802.11 family of wireless specifications defines only the PHY and MAC layer protocols for the WLAN. In a WLAN system, other protocols may be needed to provide satisfactory user performance. For example, an interface between the device host system (which may include, for example, a processor and memory) and the device WLAN module should be optimized for overall throughput.

In the design of a WLAN module for a wireless device, it is often assumed that the device host system and interface are sized sufficiently in terms of speed and memory capacity to service the WLAN module in both directions, outgoing (from the host system to an external user such as an access point via the WLAN module) and incoming (from an external user such as an access point to the host system via the WLAN module). In particular, this capability implies that the host system and interface are fast enough to process the data frames sent to the WLAN module and received from the WLAN module. This assumption may be valid for powerful host systems such as a personal computer (PC). However, WLAN systems are today often used in resource-limited host systems, such as mobile phones, PDAs, etc. where this assumption of adequate speed and memory resources may no longer be true. Thus, the assumption of sufficiently powerful host systems and interfaces in a resource-limited device environment may result in severe performance degradation in terms of WLAN spectral efficiency.

For example, in wireless devices, the WLAN may need to operate concurrently with other radio systems such as cellular radio, Global Positioning System (GPS) receivers, Bluetooth radios, etc. Reduced spectrum efficiency within resource-limited wireless devices directly translates into increased inter-system interference which can severely degrade the overall performance of a WLAN-enabled wireless device.

FIG. 1 illustrates an example block diagram of a wireless device 100 comprising a WLAN module 110, host system 170 and interface module 160. As shown in FIG. 1, the WLAN module 110 comprises an antenna 120 for radiative coupling between wireless electromagnetic waveforms and internal RF signals, a WLAN transceiver 130 for modulating and demodulating internal RF signals, a receive buffer 140 for buffering receive frames in the incoming direction, and a send buffer 150 for buffering transmit frames in the outgoing direction. The interface module 160 provides a compatible interface between the WLAN module 110 and the host system 170. For example, the interface module 160 could provide rate matching, protocol conversion, format conversion, etc. between the WLAN module 110 and host system 170. The host system 170 provides the application-oriented services for the wireless device 100. In one example, the host system 170 comprises of a processor with associated memory and software for a variety of applications.

The receive buffer 140 stores data packets received by the WLAN transceiver 130 that are to be passed to the host system 170 via the interface module 160. The send buffer 150 stores data packets from the host system 170 to be sent by the WLAN transceiver 130. In practical wireless devices, both send and receive buffers have limited memory size. Reasons for the limited memory size may be cost, physical space, weight and/or power consumption. For example, the receive buffer 140 can overflow when the host system 170 is not fast enough to retrieve and process the data packets from the receive buffer 140. If this situation occurs, the WLAN transceiver 130 must either drop or stop acknowledging the data packets inbound from the access point (AP) transmitting the data packets.

In one example, dropped data packets will cause unrecoverable loss of information at the physical (PHY) layer for connectionless data services such as provided by the User Datagram Protocol (UDP), or will trigger retransmission at a higher layer for connection-oriented data services such as provided by the Transmission Control Protocol (TCP). In most commercial wireless systems, the WLAN transceiver 130 will stop acknowledging the incoming data packet when the receive buffer 140 overflows. By not acknowledging the incoming data packet, it will trigger the AP to retransmit the unacknowledged incoming data packet repetitively until the WLAN module 110 can free up the receive buffer 140 to accept the incoming data packet and acknowledge receipt of the retransmitted incoming data packet. Alternatively, the AP will retransmit the incoming data packet until the retransmission limit of the AP has been reached. In this case, the incoming data packet is dropped.

Either data packet retransmission or data packet loss can reduce the WLAN spectrum efficiency. Furthermore, data packet retransmissions can cause severe interference to other radios in the same wireless device or in the vicinity, resulting in overall performance degradation of a WLAN-enabled wireless device. The present disclosure describes a flow control method to resolve this problem.

The disclosed flow control method predicts and/or detects the occurrence of a receive buffer overflow, and takes advantage of the WLAN power save mechanism to adjust the speed of incoming data flow from the AP to the wireless device. As a result, this flow control method avoids unnecessary retransmissions and data packet dropping, and results in improved WLAN spectrum efficiency and reduced interference.

The following definitions are used in the disclosed flow control method:

1. The total size of the receive buffer is denoted by $S_r$, which is limited and may be fixed in the WLAN module.

2. $S_t$ is the size of the receive buffer being occupied at current time t. $S_t$ is a variable depending on the speed of the incoming data flow from the AP to the wireless device, and the processing/retrieving speed of the host system and the interface.

3. $S_0 \leq S_r$ is the overflow threshold such that if $S_t > S_0$, then a receive buffer overflow warning is declared by the WLAN module. $S_0$ is a variable that can be either set offline or tuned in real time.

4. $S_1 \leq S_r$ is the underflow threshold such that if $S_t < S_1$, then a receive buffer underflow indication is declared by the WLAN module. $S_1$ is a variable that can be either set offline or tuned in real time. In normal scenarios, $S_1 \leq S_0$.

Figure 2:
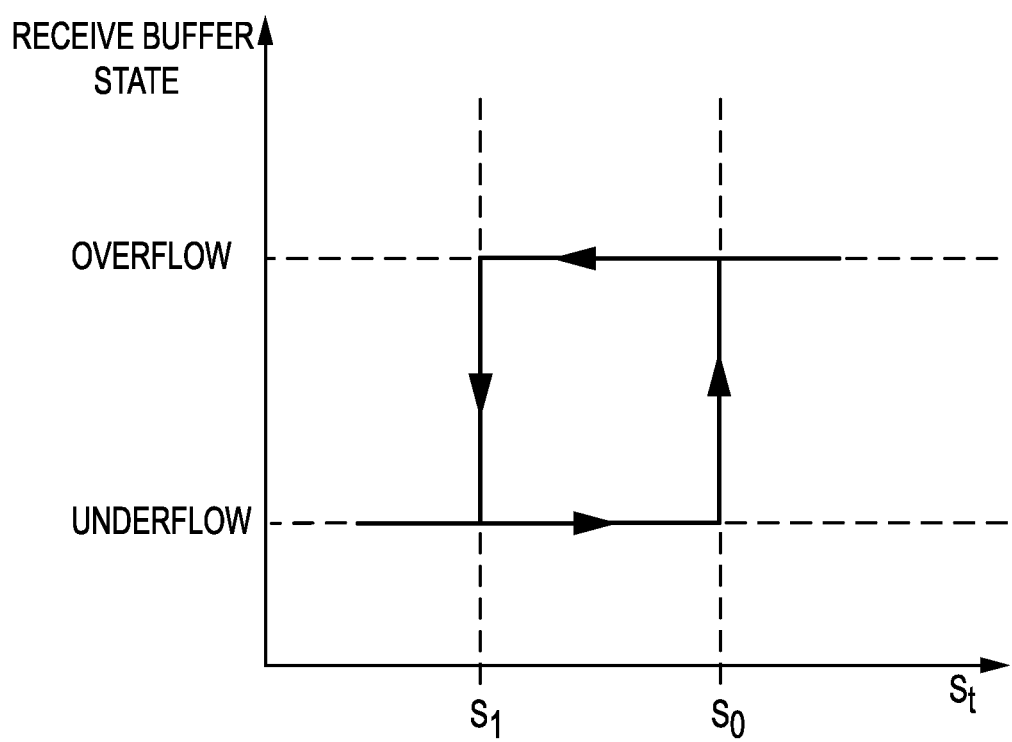
FIG. 2 illustrates an example of state changes between receive buffer overflow and receive buffer underflow.

FIG. 2 illustrates an example of state changes between receive buffer overflow and receive buffer underflow. In one aspect, monitor the receive buffer status by comparing the current buffer usage $S_r$ with the overflow threshold $S_0$ and the underflow threshold $S_1$, as depicted in FIG. 2. The wireless device informs the AP of the receive buffer status in a timely manner to allow the AP to adjust the speed of the data flow accordingly based on the receive buffer status. This is achieved by utilizing the power save mechanism of the WLAN MAC protocols.

Assume that in the initial state the receive buffer of a wireless device is in the underflow state. The wireless device can be in power active mode or in power save mode when it enters the initial state. These two scenarios are discussed separately.

In one example, the wireless device is in power active mode and a receive buffer overflow occurs ($S_r > S_0$). That is, the receive buffer is filled beyond the overflow threshold $S_0$. In this scenario, the wireless device sends a transmit packet with its power management bit set to 1 to the AP. Upon receiving this transmit packet, the AP thinks that the wireless device is in power save mode since the power management bit is 1. In reality, the wireless device does not necessarily need to enter power save mode. The AP assumes the wireless device is going to "sleep" mode, when in fact it is simply indicating that its receive buffer is nearly full and it cannot receive more data packets. The AP will then buffer all the data packets for the wireless device and stop sending data packets to the wireless device until further notice is received from the wireless device. Since an AP normally has a much larger buffer size and is much more powerful in data packet processing than a resource-limited wireless device, such as but not limited to, a mobile phone, smart phone, a personal digital assistant (PDA), a laptop, desktop computer, media player, etc., data buffer overflow is generally not a concern on the AP side. This in effect reduces the speed of the incoming data flow to zero and allows the wireless device to recover from receive buffer overflow.

After the data packets in the receive buffer are retrieved and processed by the interface module 160 and the host system 170, the wireless device can exit the receive buffer overflow state and enter the underflow state ($S_r < S_1$), since it is again ready for receiving more data packets from the AP. The wireless device sends a transmit packet with its power management bit set to 0 to the AP. Upon receiving this transmit packet, the AP will assume that the wireless device is now back in power active mode since the power management bit is 0. The AP then resumes transfer of data packet to the wireless device.

In one example, the wireless device is in power save mode and the receive buffer is in an overflow state ($S_r > S_0$). In this scenario, the wireless device stops sending PS_POLL packets or trigger packets (if the wireless device has been configured to be trigger-enabled) to the AP even if the AP indicates there are buffered data packets for the wireless device. Per the WLAN MAC protocol, without receiving a PS_POLL packet or a trigger packet (if the wireless device has been configured to be trigger-enabled) from the device, the AP will restrain from sending any data packet to the wireless device in power save mode.

After the wireless device recovers from the receiver buffer overflow state and is ready to receive more data packets ($S_r < S_1$), the wireless device sends a PS_POLL packet or a trigger packet (if the wireless device has been configured to be trigger-enabled) to the AP if there are buffered data packets for the wireless device as indicated in the broadcasted BEACON packets from the AP. Upon receiving the PS_POLL packet or a trigger packet (if the wireless device has been configured to be trigger-enabled), the AP sends the buffered data packets to the wireless device per the WLAN MAC protocol.

Figure 3A:
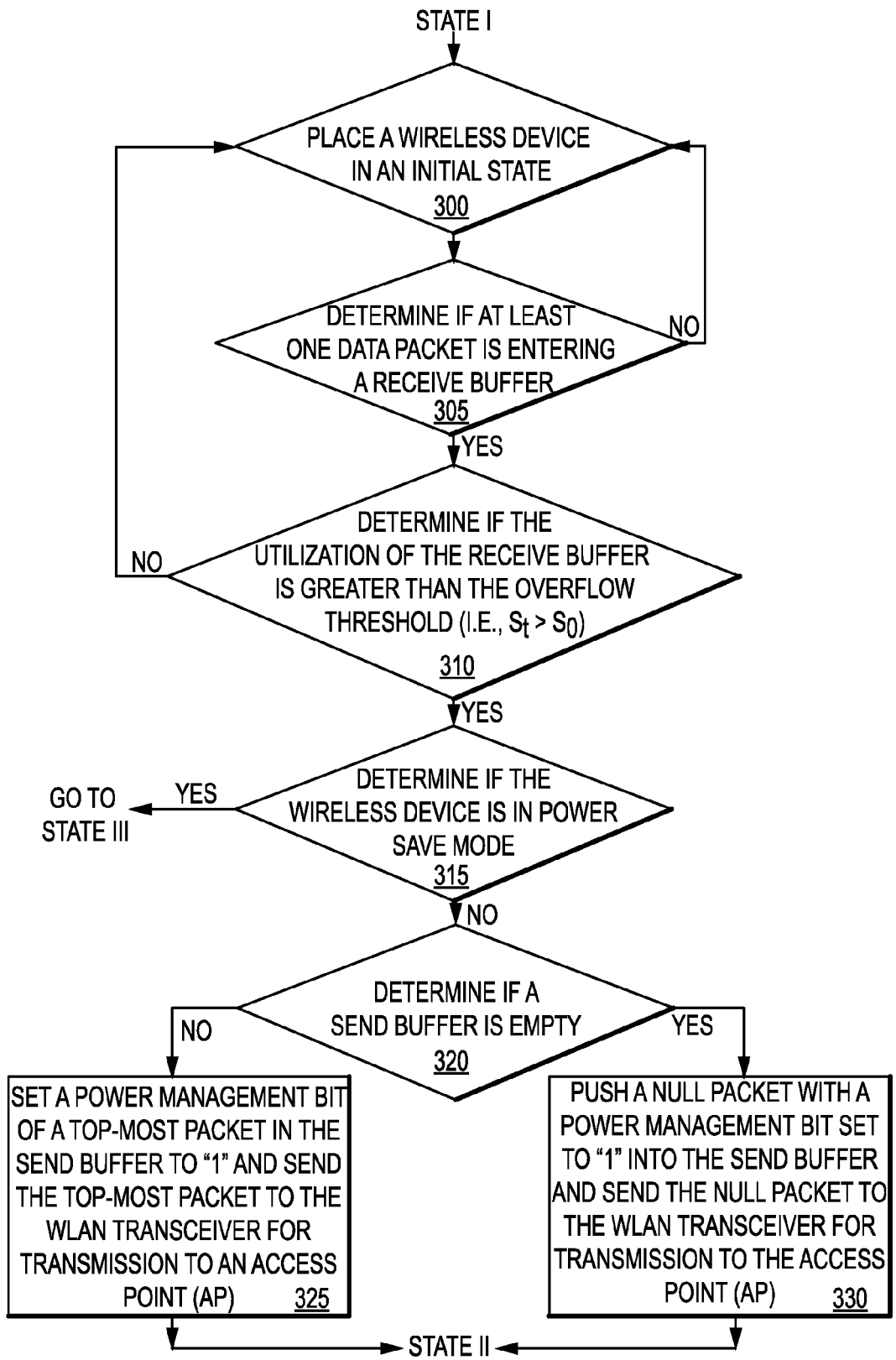
FIGS. 3a, 3b and 3c illustrate an example flow diagram for improving WLAN spectrum efficiency and reducing interference by flow control.
Figure 3B:
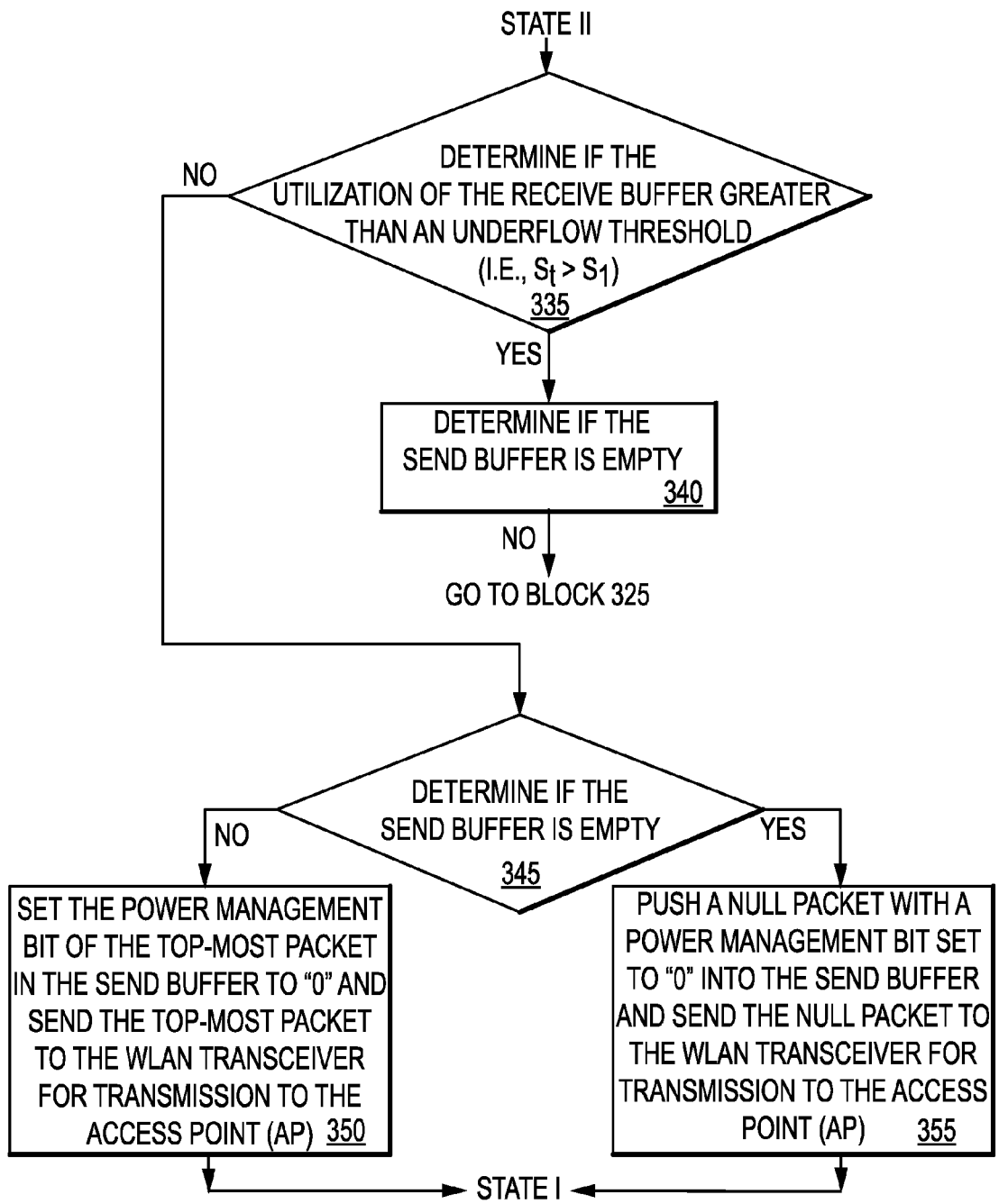
Figure 3C:
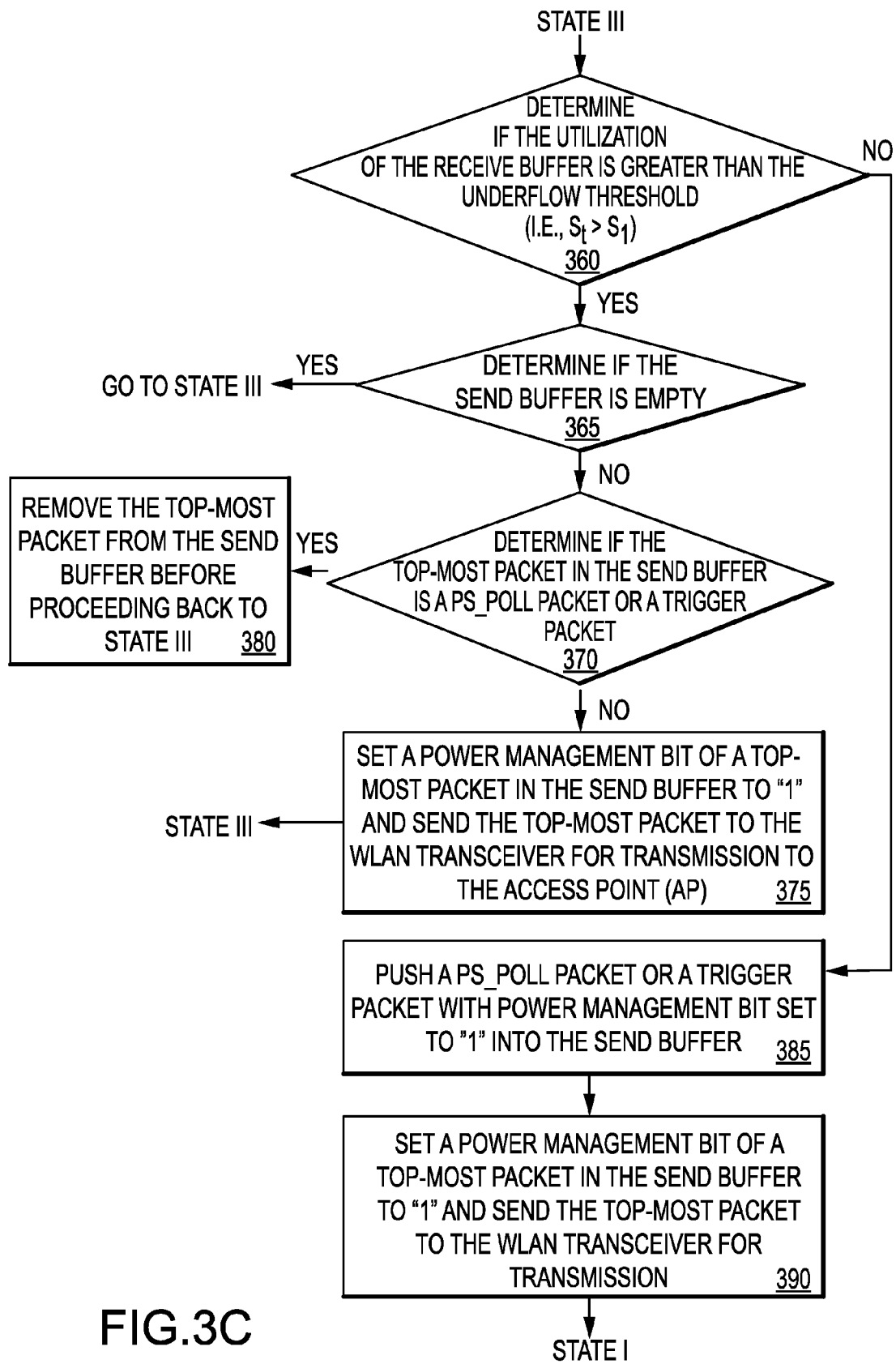

FIGS. 3a, 3b and 3c illustrate an example flow diagram for improving WLAN spectrum efficiency and reducing interference by flow control. The three figures are interconnected with one another as is obvious from FIGS. 3a, 3b and 3c and from their respective descriptions. FIG. 3a starts with State I. State I starts with block 300. In block 300, place a wireless device in an initial state. Once the wireless device is in the initial state, in block 305, determine if at least one data packet is entering a receive buffer. The receive buffer is the buffer in the wireless device for storing incoming data packets before routing the data packets to an interface module. If no data packet is entering the receive buffer, return to block 300. If at least one data packet is entering the receive buffer, proceed to block 310.

In block 310, determine if the utilization of the receive buffer is greater than the overflow threshold (i.e., $S_r > S_0$). That is, the receive buffer is in an overflow state. If no, return to block 300. If yes, proceed to block 315. In block 315, determine if the wireless device is in power save mode. If yes, proceed to State III. If the wireless device is not in power save mode, proceed to block 320. In block 320, determine if a send buffer is empty. The send buffer stores data packets from the interface module 160 to the WLAN transceiver 130. If the send buffer is not empty, proceed to block 325 to set a power management bit of a top-most packet in the send buffer to "1" and send the top-most packet to the WLAN transceiver for transmission to an access point (AP). Following block 325, proceed to State II. If the send buffer is empty, proceed to block 330. In block 330, push a NULL packet with a power management bit set to "1" into the send buffer and send the NULL packet to the WLAN transceiver for transmission to the access point (AP). Following block 330, proceed to State II. Thus, in either case, a transmit packet (i.e., the top-most packet or the NULL packet) with a power management bit set to "1" is sent to the WLAN transceiver for transmission to the AP.

FIG. 3b starts with State II. State II starts with block 335. In block 335, determine if the utilization of the receive buffer greater than an underflow threshold (i.e., $S_r > S_1$). If no, proceed to block 345. In block 345, determine if the send buffer is empty. If the send buffer is not empty, proceed to block 350. In block 350, set the power management bit of the top-most packet in the send buffer to "0" and send the top-most packet to the WLAN transceiver for transmission to the access point (AP). Following block 350, proceed back to State I. If the send buffer is empty, proceed to block 355 to push a NULL packet with a power management bit set to "0" into the send buffer and send the NULL packet to the WLAN transceiver for transmission to the access point (AP). Following block 355, proceed back to State I. Thus, in either case, a transmit packet (i.e., the top-most packet or the NULL packet) with a power management bit set to "0" is sent to the WLAN transceiver for transmission to the AP. So, if the utilization of the receive buffer is not greater than the underflow threshold, the power management bit set to "0" is an indication to the AP that the wireless device is again ready to receive data packets.

If the utilization of the receive buffer is greater than the underflow threshold, proceed to block 340 to determine if the send buffer is empty. If the send buffer is empty, return to the start of State II. If the send buffer is not empty, proceed back to block 325. In this case, the AP assumes the wireless device is going to "sleep" mode and cannot receive more data packets. The AP will then buffer all the data packets for the wireless device and stop sending data packets to the wireless device until further notice.

FIG. 3c starts with State III. State III starts with block 360. In block 360, determine if the utilization of the receive buffer is greater than the underflow threshold. If yes, proceed to block 365 to determine if the send buffer is empty. If the send buffer is empty, proceed back to State III. If the send buffer is not empty, proceed to block 370. In block 370, determine if the top-most packet in the send buffer is a PS_POLL packet or a trigger packet. If yes, proceed to block 380 and remove the top-most packet from the send buffer before proceeding back to State III. If the top-most packet in the send buffer is not a PS_POLL packet or a trigger packet, proceed to block 375. In block 375, set a power management bit of a top-most packet in the send buffer to "1" and send the top-most packet to the WLAN transceiver for transmission to the access point (AP). Following block 375, proceed back to State III.

If in block 360, it is determined that the receive buffer is not in underflow, proceed to block 385. In block 385, push a PS_POLL packet or a trigger packet (if the wireless device has been configured to be trigger-enabled) with power management bit set to "1" into the send buffer. Following block 385, in block 390, set a power management bit of a top-most packet in the send buffer to "1" and send the top-most packet to the WLAN transceiver for transmission. Following block 390, proceed back to State I.

In one aspect, the steps presented in FIGS. 3a, 3b and 3c are performed by a processor within the wireless device. The processor may comprise of more than one processor unit and may reside with the WLAN transceiver 130, WLAN module 110 or the host system 170. In another aspect, the processor resides outside the WLAN module and the host system.

One skilled in the art would understand that the steps disclosed in the example composite flow diagram in FIGS. 3a, 3b and 3c can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
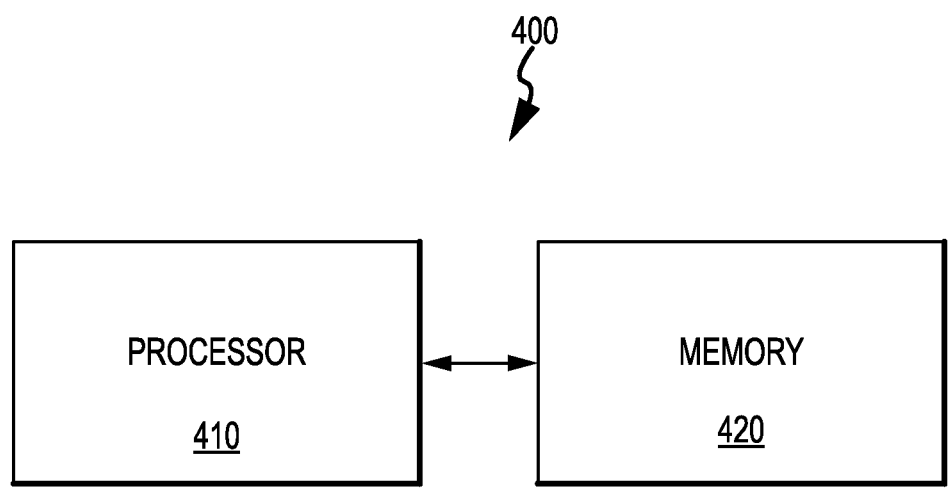
FIG. 4 illustrates an example of a wireless device comprising a processor in communication with a memory for executing the processes for improving WLAN spectrum efficiency and reducing interference by flow control.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 illustrates an example of a wireless device 400 comprising a processor 410 in communication with a memory 420 for executing the processes for improving WLAN spectrum efficiency and reducing interference by flow control. In one example, the wireless device 400 is used to implement the algorithm illustrated in FIGS. 3a, 3b and 3c. In one aspect, the memory 420 is located within the processor 410. In another aspect, the memory 420 is external to the processor 410. In one aspect, the processor includes circuitry for implementing or performing the various flow diagrams, logical blocks and/or modules described herein.

Figure 5A:
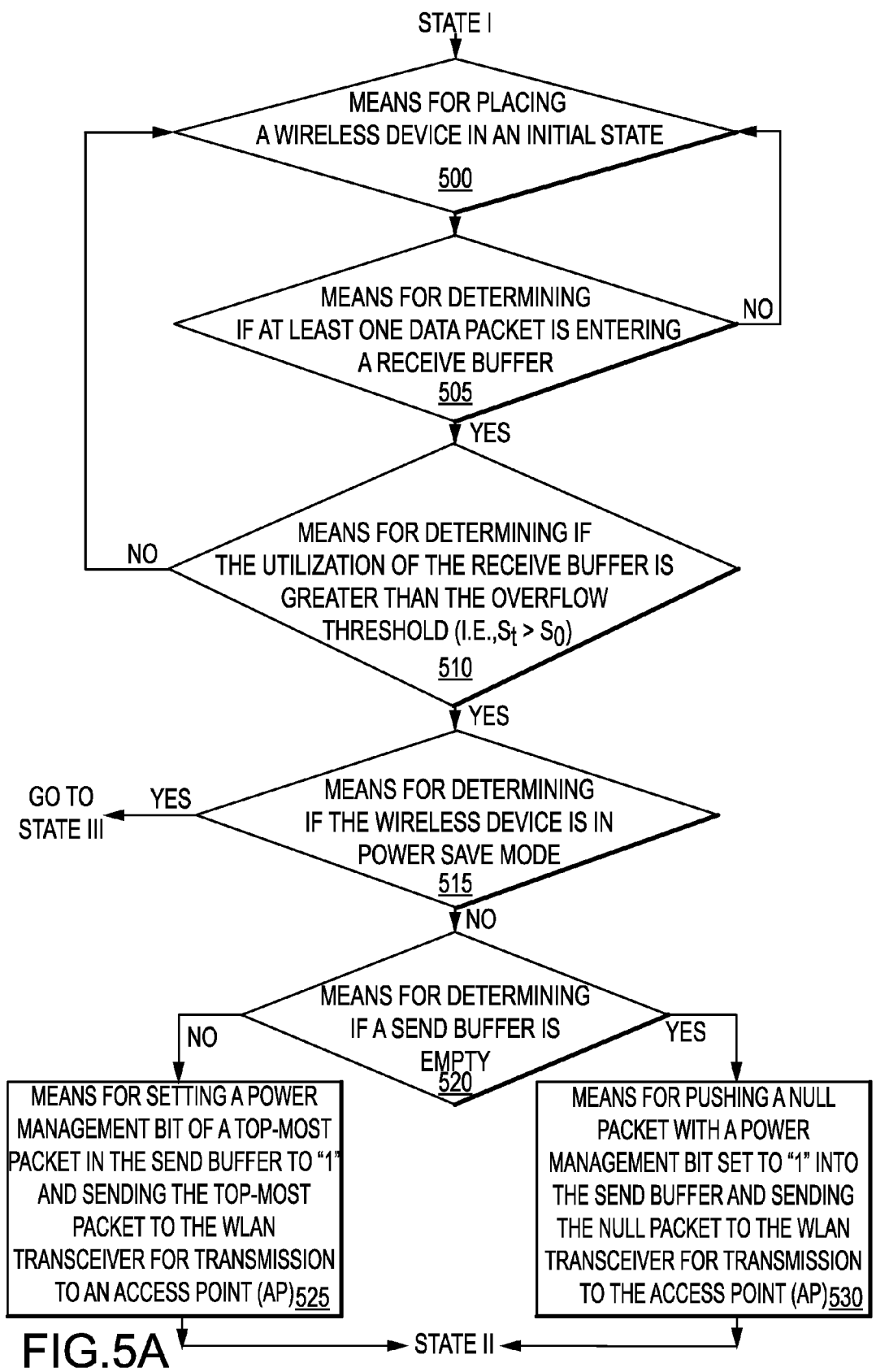
FIGS. 5a, 5b and 5c illustrate an example of a wireless device 500 suitable for improving WLAN spectrum efficiency and reducing interference by flow control.
Figure 5B:
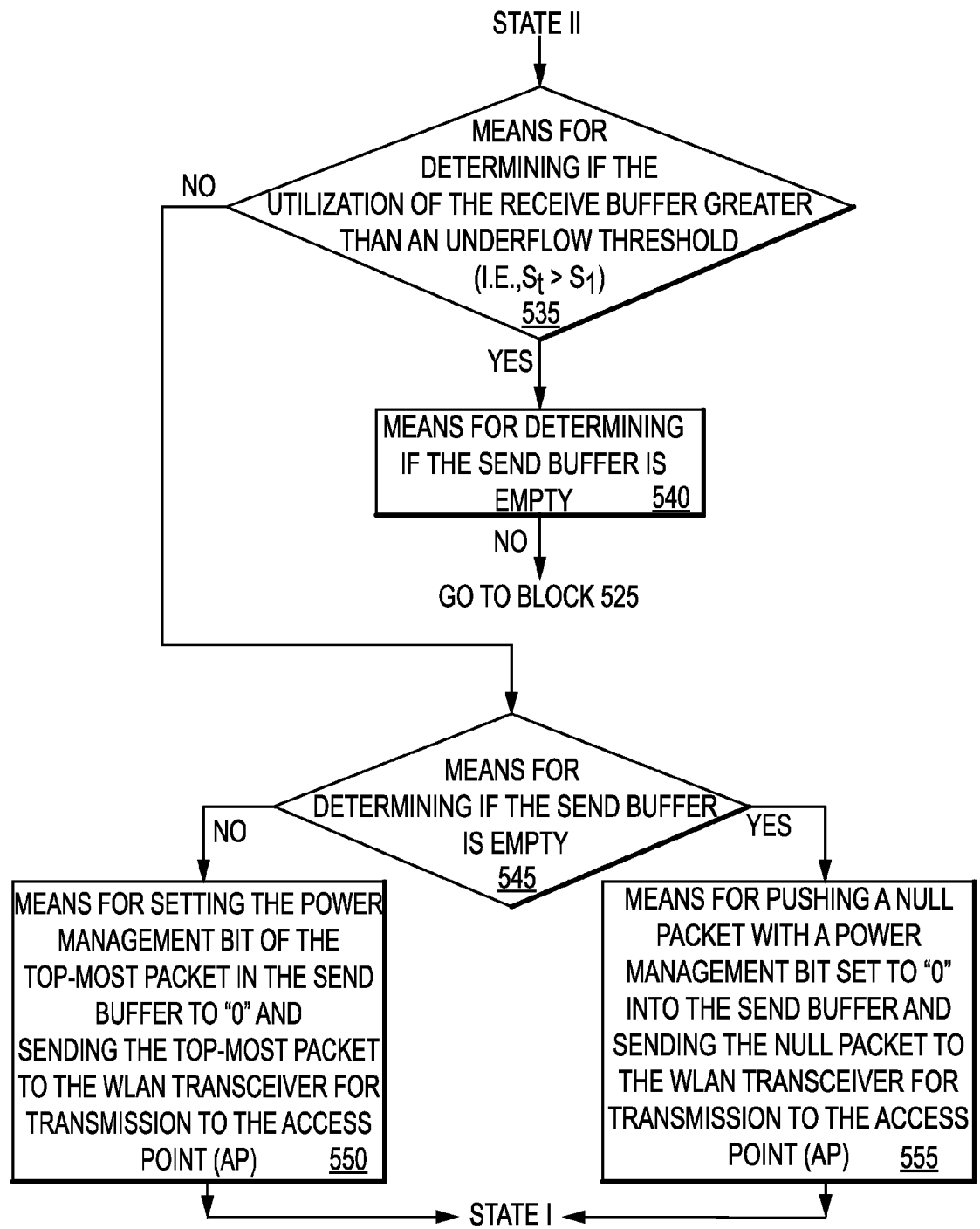
Figure 5C:
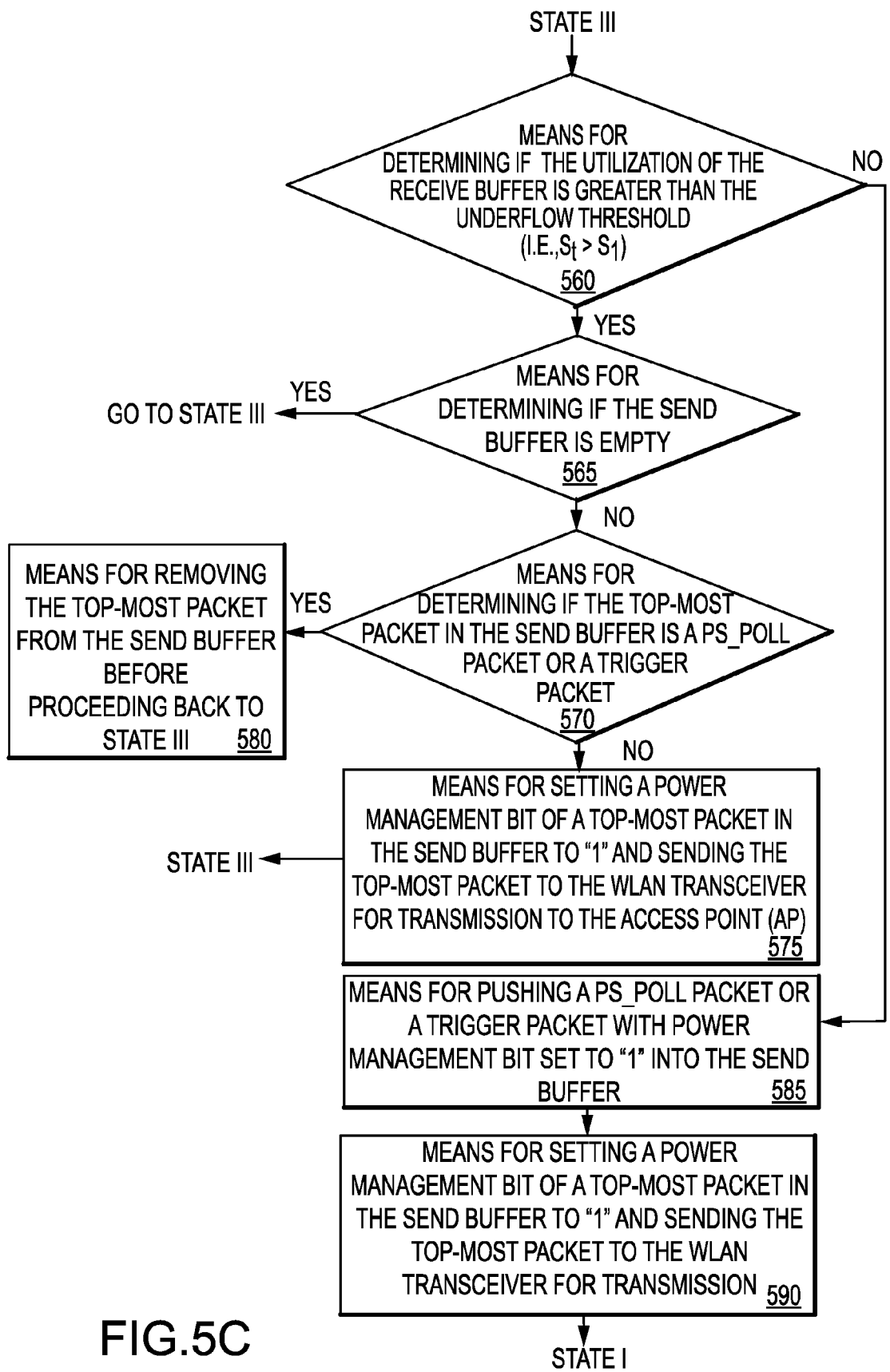

FIGS. 5a, 5b and 5c illustrate an example of a wireless device 500 suitable for improving WLAN spectrum efficiency and reducing interference by flow control. In one aspect, the wireless device 500 is implemented by at least one processor comprising one or more modules configured to provide different aspects of improving WLAN spectrum efficiency and reducing interference by flow control as described herein in blocks 505, 510, 515, 520, 525, 530, 535, 540, 545, 550, 555, 560, 565, 570, 575, 580, 585 and 590. For example, each module comprises hardware, firmware, software, or any combination thereof In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for improving WLAN spectrum efficiency and reducing interference by flow control comprising:
    determining if at least one data packet is entering a receive buffer;
    determining if the utilization of the receive buffer is greater than an overflow threshold in response to at least one data packet entering the receive buffer;
    determining if a wireless device is in power save mode when the utilization of the receive buffer is greater than the overflow threshold, wherein the wireless device comprises the receive buffer, a WLAN transceiver and a send buffer for storing packets from an interface module to the WLAN transceiver;
    determining if the send buffer is empty when the wireless device is not in the power save mode;
    setting a power management bit to "1" in either a top-most packet in the send buffer when the send buffer is not empty or a NULL packet when the send buffer is empty;
    using the WLAN transceiver for transmitting either the top-most packet or the NULL packet to an access point; and
    determining if the utilization of the receive buffer is greater than an underflow threshold in response to transmitting either the top-most packet or the NULL packet to the access point.

2. The method of claim 1 further comprising setting the power management bit to "1" in the top-most packet and using the WLAN transceiver for transmitting the top-most packet to the access point for a second time.

3. The method of claim 1 wherein if the utilization of the receive buffer is not greater than the underflow threshold, then further comprising:
    determining if the send buffer is still empty;
    setting the power management bit to 0 in either the top-most packet in the send buffer or the NULL packet; and
    transmitting the top-most packet or the NULL packet to the access point with the power management bit set to 0.

4. The method of claim 3 further comprising placing the wireless device in an initial state.

5. A method for improving WLAN spectrum efficiency and reducing interference by flow control comprising:
    using a processor in a wireless device for determining if at least one data packet is entering a receive buffer;
    determining if the utilization of the receive buffer is greater than an overflow threshold in response to at least one data packet entering the receive buffer;
    determining that the wireless device is in power save mode when the utilization of the receive buffer is greater than the overflow threshold, wherein the wireless device comprises the receive buffer, a WLAN transceiver and a send buffer for storing packets from an interface module to the WLAN transceiver;
    determining if the utilization of the receive buffer is greater than an underflow threshold when the wireless device in the power save mode;
    determining if the send buffer is empty when the utilization of the receive buffer is greater than the underflow threshold; and
    determining if a top-most packet in the send buffer is a PS_POLL packet or a trigger packet when the send buffer is not empty.

6. The method of claim 5 further comprising setting the power management bit to "1" in the top-most packet in the send buffer and transmitting the top-most packet to an access point.

7. The method of claim 5 further comprising removing the top-most packet from the send buffer if the top-most packet is the PS_POLL packet or a trigger packet.

8. A method for improving WLAN spectrum efficiency and reducing interference by flow control comprising:
    using a processor in a wireless device for determining if at least one data packet is entering a receive buffer;
    determining if the utilization of the receive buffer is greater than an overflow threshold in response to at least one data packet entering the receive buffer;
    determining that the wireless device is in power save mode when the utilization of the receive buffer is greater than the overflow threshold, wherein the wireless device comprises the receive buffer, a WLAN transceiver and a send buffer for storing packets from an interface module to the WLAN transceiver;
    determining if the utilization of the receive buffer is greater than an underflow threshold when the wireless device is in power save mode;
    pushing a PS_POLL packet or a trigger packet with power management bit set to "1" into the send buffer when the utilization of the receive buffer is not greater than an underflow threshold; and
    setting the power management bit to "1" in a top-most packet in the send buffer and using the WLAN transceiver to transmit the top-most packet to an access point.

9. A wireless device for improving WLAN spectrum efficiency and reducing interference by flow control comprising:
    a WLAN transceiver for receiving at least one data packet;
    a receive buffer for storing the at least one data packet;
    a host system with an interface module coupled to the receive buffer wherein the host system processes the at least one data packet;
    a send buffer coupled to the interface module for storing packets from the host system to the WLAN transceiver; and
    a processor configured to perform the following steps:
        determine if the at least one data packet is entering the receive buffer;
        determine if the utilization of the receive buffer is greater than an overflow threshold in response to at least one data packet entering the receive buffer and determine if utilization of the receive buffer is greater than an underflow threshold;
        determine if the wireless device is in power save mode when the utilization of the receive buffer is greater than the overflow threshold;
        determine if the send buffer is empty when the utilization of the receive buffer is greater than the underflow threshold;
        set a power management bit to "1" in either a top-most packet in the send buffer when the send buffer is not empty or a NULL packet when the send buffer is empty;
        command the WLAN transceiver to transmit either the top-most packet or the NULL packet to an access point; and determine if the utilization of the receive buffer is greater than an underflow threshold in response to transmitting either the top-most packet or NULL packet to the access point.

10. The wireless device of claim 9 wherein the processor is further configured to set the power management bit to "1" in the top-most packet; and wherein the WLAN transceiver transmits the top-most packet to the access point for a second time.

11. The wireless device of claim 9 wherein if the utilization of the receive buffer is not greater than the underflow threshold, then
the processor is further configured to determine if the send buffer is still empty; and set the power management bit to 0 in either the top-most packet in the send buffer or the NULL packet; and
the WLAN transmitter transmits to the access point either the top-most packet with the power management bit set to 0, or the NULL packet with the power management bit set to 0.

12. The wireless device of claim 11 wherein the processor is further configured to place the wireless device in an initial state.

13. A wireless device for improving WLAN spectrum efficiency and reducing interference by flow control comprising:
a WLAN transceiver for receiving at least one data packet;
a receive buffer for storing the at least one data packet;
a host system with an interface module coupled to the receive buffer wherein the host system processes the at least one data packet;
a send buffer coupled to the interface module for storing packets from the host system to the WLAN transceiver; and
a processor configured to perform the following steps:
determine if the at least one data packet is entering the receive buffer;
determine if the utilization of the receive buffer is greater than an overflow threshold in response to at least one data packet entering the receive buffer;
determine that the wireless device is in power save mode when the utilization of the receive buffer is greater than the overflow threshold;
determine if the utilization of the receive buffer is greater than an underflow threshold when the wireless device in the power save mode;
determine if the send buffer is empty when the utilization of the receive buffer is greater than the underflow threshold; and
determine if a top-most packet in the send buffer is a PS_POLL packet or a trigger packet when the send buffer is not empty.

14. The wireless device of claim 13 wherein
the processor is further configured to set the power management bit to "1" in the top-most packet in the send buffer; and
the WLAN transceiver transmits the top-most packet to an access point.

15. The wireless device of claim 13 wherein the processor is further configured to remove the top-most packet from the send buffer if the top-most packet is the PS_POLL packet or a trigger packet.

16. A wireless device for improving WLAN spectrum efficiency and reducing interference by flow control comprising:
a WLAN transceiver for receiving at least one data packet;
a receive buffer for storing the at least one data packet;
a host system with an interface module coupled to the receive buffer wherein the host system processes the at least one data packet;
a send buffer coupled to the interface module for storing packets from the host system to the WLAN transceiver; and
a processor configured to perform the following steps:
determine if the at least one data packet is entering the receive buffer;
determine if the utilization of the receive buffer is greater than an overflow threshold in response to at least one data packet entering the receive buffer;
determine that the wireless device is in power save mode when the utilization of the receive buffer is greater than the overflow threshold;
determine if the utilization of the receive buffer is greater than an underflow threshold when the wireless device is in power save mode
push a PS_POLL packet or a trigger packet with power management bit set to "1" into the send buffer when the utilization of the receive buffer is not greater than an underflow threshold; and
set the power management bit to "1" in a top-most packet in the send buffer; and
wherein the WLAN transceiver transmits the top-most packet to an access point.

17. A non-transitory computer-readable medium having a computer program comprising instructions, which when executed by at least one processor, operates to improve WLAN spectrum efficiency and reduce interference by flow control, the computer program comprising:
instructions for determining if at least one data packet is entering a receive buffer;
instructions for determining if the utilization of the receive buffer is greater than an overflow threshold in response to at least one data packet entering the receive buffer;
instructions for determining if a wireless device is in power save mode when the utilization of the receive buffer is greater than the overflow threshold, wherein the wireless device comprises the receive buffer, a WLAN transceiver and a send buffer for storing packets from an interface module to the WLAN transceiver;
instructions for determining if the send buffer is empty when the wireless device is not in the power save mode;
instructions for setting a power management bit to "1" in either a top-most packet in the send buffer when the send buffer is not empty or a NULL packet when the end buffer is empty; and
instructions for using the WLAN transceiver for transmitting either the top-most packet or the NULL packet to an access point; and
instructions for determining if the utilization of the receive buffer is greater than an underflow threshold in response to transmitting either the top-most packet or the NULL packet to the access point.

18. A non-transitory computer-readable medium having a computer program comprising instructions, which when executed by at least one processor, operates to improve WLAN spectrum efficiency and reduce interference by flow control, the computer program comprising:
instructions for determining if at least one data packet is entering a receive buffer;
instructions for determining if the utilization of the receive buffer is greater than an overflow threshold in response to at least one data packet entering the receive buffer;
instructions for determining that a wireless device is in power save mode when the utilization of the receive buffer is greater than the overflow threshold, wherein the wireless device comprises the receive buffer, a WLAN transceiver and a send buffer for storing packets from an interface module to the WLAN transceiver;

instructions for determining if the utilization of the receive buffer is greater than an underflow threshold when the wireless device in the power save mode instructions for determining if the send buffer is empty when the utilization of the receive buffer is greater than the underflow threshold; and instructions for determining if a top-most packet in the send buffer is a PS_POLL packet or a trigger packet when the send buffer is not empty.

19. A non-transitory computer-readable medium having a computer program recorded thereon which when executed by at least one processor, operates to improve WLAN spectrum efficiency and reduce interference by flow control, the computer program comprising the steps of:

instructions for determining if at least one data packet is entering a receive buffer;

instructions for determining if the utilization of the receive buffer is greater than an overflow threshold in response to at least one data packet entering the receive buffer;

instructions for determining that a wireless device is in power save mode when the utilization of the receive buffer is greater than the overflow threshold, wherein the wireless device comprises the receive buffer, a WLAN transceiver and a send buffer for storing packets from an interface module to the WLAN transceiver;

instructions for determining if the utilization of the receive buffer is greater than an underflow threshold when the wireless device is in power save mode instructions for pushing a PS_POLL packet or a trigger packet with power management bit set to "1" into the send buffer when the utilization of the receive buffer is not greater than an underflow threshold;

instructions for setting the power management bit to "1" in a top-most packet in the send buffer; and instructions for using the WLAN transceiver to transmit the top-most packet to an access point.

\* \* \* \* \*